United States Patent

[11] 3,589,685

[72] Inventor Frederick John Gradishar
1218 Evergreen Road, Carrcroft Crest,
Wilmington, Del. 19803
[21] Appl. No. 797,206
[22] Filed Feb. 6, 1969
[45] Patented June 29, 1971

[54] MIXING AND FOAM-PRODUCING DEVICE
11 Claims, 7 Drawing Figs.
[52] U.S. Cl. .................................................. 259/124
[51] Int. Cl. ................................................... B01f 13/00
[50] Field of Search........................................... 222/94,
129, 146 H, 136, 145, 191, 192; 239/590.3, 124,
113; 259/112, 113, 124

[56] References Cited
UNITED STATES PATENTS
964,291 7/1910 Mattern.................. 259/113 UX 2,971,793 2/1961 Peterson et al. ............... 222/129 X
3,341,079 9/1967 Marroffino.................... 222/136

Primary Examiner—Stanley H. Tollberg
Assistant Examiner—Norman L. Stack, Jr.
Attorney—Connolly and Hutz ABSTRACT: A mixing and foam-producing device includes a container closed at one end and holding a predetermined quantity of foam-producing agent therein. A removable cover closes the other end of the container to define a closed chamber of predetermined quantity. Extending through the cover is a rod with a piston attached thereto for intermittently moving toward and away from the foam-producing agent whereby a liquid which is placed in the chamber mixes with air and foam-producing agent to create a foam. Indicating means are also provided to control the relationship between the volumes of liquid and air in the chamber.

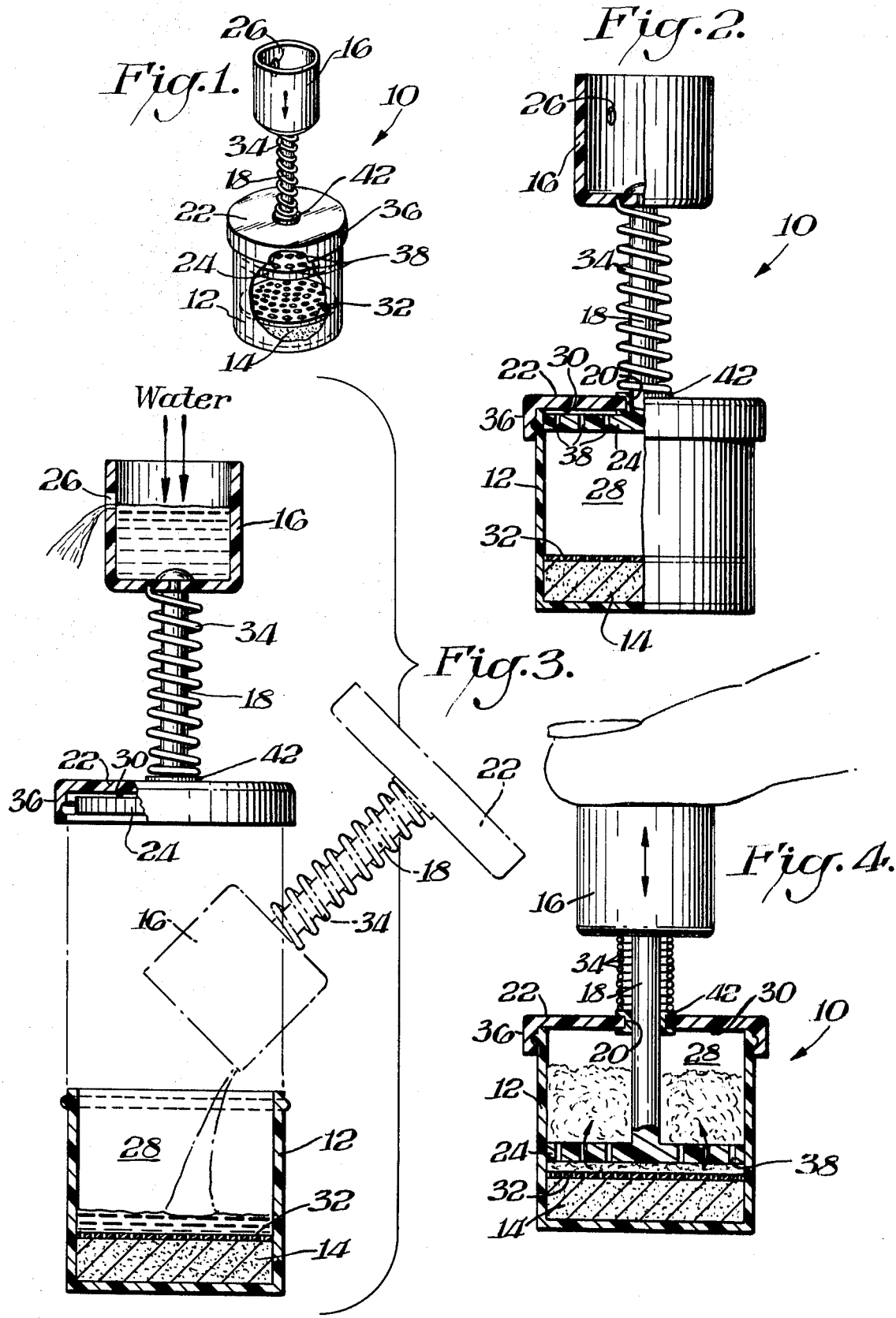

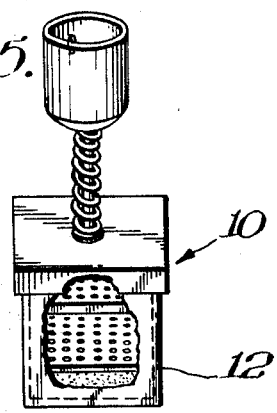
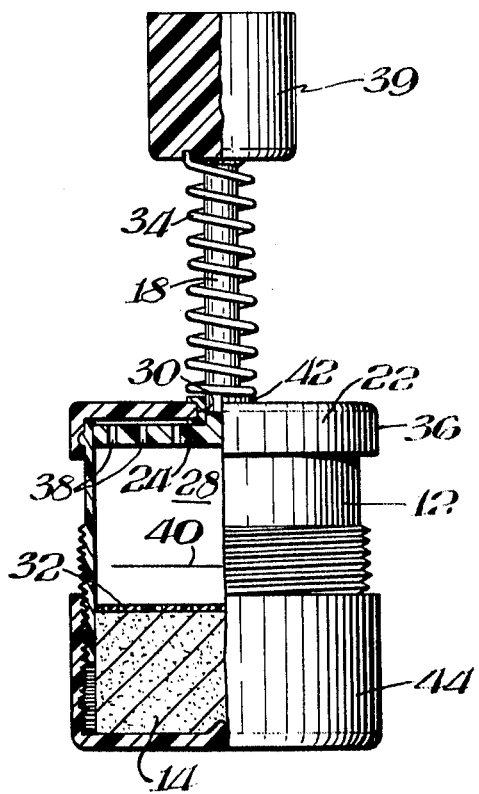
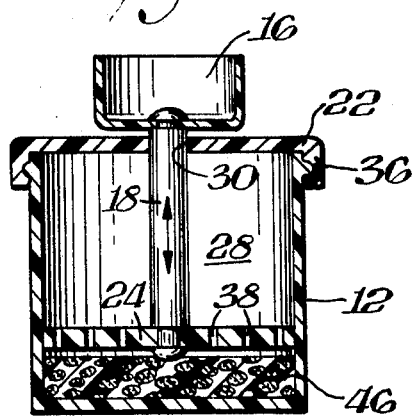

MIXING AND FOAM-PRODUCING DEVICE

BACKGROUND OF INVENTION

This invention relates to a device for mixing a solid, a liquid and air to produce a foamed product. The solid may be of single or multiple ingredients and may be in the form of a compacted solid block, a paste or a mass of powdered solid particles. The device is particularly adapted to produce hot shaving lather foam but also has utility in other areas such as the preparation of hair-coloring products or foamed food products such as whipped topping.

Various foam-producing devices have long existed in the art. In the field of hot shaving lather production, for example, various attempts have been made at providing foam-producing devices of the aerosol type. Other foam-producing devices also exist in the food preparation art. Examples of prior art devices are found in U.S. Pat. Nos. 966,738; 1,101,693; 2,889,078; 2,998,684; 3,140,078; 3,226,100; 3,240,396; 3,298,919; 3,308,993; 3,338,477; 3,346,908; 3,350,159; 3,351,416; 3,368,719.

Despite the many attempts at foam-producing devices there is a definite need for a device which is both compact and convenient to operate to produce, for example, a hot shaving lather foam. Additionally, it is desirable to have such a device of a size and capacity to produce only the required amount of shaving lather for a single use each time it is used.

SUMMARY OF INVENTION

An object of this invention is to provide such a device which fulfills the above needs.

A further object of this invention is to provide such a device which optimizes the consistency of the product produced by carefully controlling the proportions of liquid and air which mix with the foam-producing agent.

A still further object of this invention is to provide such a device which is simple, lightweight, easy to operate and requires only a minimum of tooling whereby it is capable of mass manufacture at low cost per unit.

A still further object of this invention is to provide such a device which stores a supply of foam-producing agent therein but consumes only the required amount for a single use with the remainder being available for subsequent uses.

In accordance with this invention the mixing and foam-producing device comprises a container which is closed at one end for holding the foam-producing agent. A removable cover closes the other end of the container and a piston rod extends through the cover with a plunger or piston attached at the end of the rod in the container. Indicating means are provided to control the volumetric relationship between liquid which is placed in the container and the air therein so that the plunger may be reciprocated to mix the air and liquid with the foam-producing agent and thereby create foam of the optimum consistency.

The indicating means may be a metering cup attached to the exposed end of the rod to hold a predetermined quantity of liquid and also to act as a convenient grasping device or handle to facilitate manipulation of the rod. In the preferred form of this invention the metering cup is of the exact capacity required for the predetermined quantity of liquid. In an alternative form, however, the metering cup is of greater capacity than required for the liquid but includes a metering orifice whereby excess liquid will be discharged from the cup.

In a particularly advantageous form of this invention the foam-producing agent is absorbed in a spongelike pad. Alternatively a block of the foam-producing agent may be provided in the container with a thin spongelike disc disposed above it. In a still further form of the invention a perforated protective disc may be disposed above the foam-producing agent to prevent direct contact of the plunger against the foam-producing agent.

When used to produce hot shave lather foam it has been found advantageous to maintain the proportion of air to liquid at about 10—15 to 1, with the container having for example about 60 ml. capacity and the metering cup about 4 ml. capacity. The hot shave lather is produced by using a hot liquid such as can conveniently be obtained from a hot water faucet.

THE DRAWINGS

FIG. 1 is a perspective view of a device in accordance with one embodiment of this invention;

FIG. 2 is an elevation view partly in section of the device shown in FIG. 1;

FIG. 3 is an elevation view partly in section of the device shown in FIGS. 1-2 in different phases of operation;

FIG. 4 is an elevation view partly in section of the device shown in FIG. 3 in still another phase of operation;

FIG. 5 is a perspective view of a modified form of the device shown in FIGS. 1-4;

FIG. 6 is an elevation view partly in section of still another form of this invention; and FIG. 7 is a cross-sectional elevation view of a preferred form of this invention.

DETAILED DESCRIPTION

Since this device is particularly adapted for producing hot shaving lather foam the description of the device will be directed toward this use. As previously indicated, however, other foam substances may also be produced without parting from the spirit of this invention.

In general the device 10 includes a closed container 12 having a block of soap or other commercial product 14 which when mixed with liquid and air produces a shave lather foam. In other to obtain the correct consistency of the resultant lather it is critical to control the amounts of liquid and air mixed with foam-producing agent 14. Accordingly, as illustrated in FIGS. 1—5 a metering cup 16 is provided at the end of piston rod 18 which extends through a central aperture 20 in removable cover 22. At the end of handle 18 is a perforated disclike plunger or piston 24.

In use cover 22 is removed from container 12, as shown for example in FIG. 3, with the cup, the piston and the cover unit being inserted under a hot water faucet whereby hot water may be placed into cup 16 until water begins to flow through metering orifice 26. Metering cup 16 is then inverted, as indicated in phantom in FIG. 3, so that the water may be poured into container 12. Cover 22 is then resecured to container 12 in any suitable manner such as by screw threads or snap action. As indicated in FIGS. 2 and 4 a closed chamber 28 is thereby formed between the inner surface 30 of cover 22 and protective disc 32 disposed above shaving soap or agent 14. The parts are so dimensioned that the optimum volumetric relationship between the air in chamber 28 and the liquid is such that upon reciprocation of rod 18 a thick hot shaving lather will quickly be formed.

With cover 22 securely in place cup 16 is held as a handle and reciprocated up and down to cause the plunger or piston 24 to move toward and away from foam agent 14. The reciprocating up and down motion effects dissolution of some of the shaving cream in the hot water and subsequent mixing of the solution with the air present in chamber 28. The manual reciprocating action is continued until a thick luxuriant shaving lather foam is produced in a matter of a relatively few seconds. Plunger 24 is then pulled adjacent inner surface 30 of cover 22. To assured that the plunger is in this position, resilient means such as spring 34 may be provided around rod 18 between cup 16 and cover 22 to bias or urge the rod upwardly with plunger 24 thus positioned within the skirt 36 of cover 22. The cup, the piston and the cover unit are removed from container 12 and the exposed shaving lather foam can be applied to the user's face with the fingers. The dimensions of container 12 are such that the amount of shaving lather foam produced is substantially the exact amount needed for a single use. In creating this amount of shaving cream, only a portion of the foam-producing agent 14 is consumed and thus the remainder of the foam-producing agent 14 may be used for later applications. Foam-producing agent 14 is sufficiently thin so that the change in its thickness dimension does not significantly alter the proportion of air in chamber 28.

Various materials may be used for device 10. For example container 12 may be of a rigid or semirigid material such as polyethylene or polypropylene plastic. Container 12 may, for example, be selected from the commercially available "2-ounce" jars. Container 12 need not necessarily be cylindrical but may have many other suitable shapes such as the rectangular or square shape illustrated in FIG. 5. When container 10 has a shape such as shown in FIG. 5 the other components of device 10 are also appropriately shaped to be adaptable with the noncircular container.

Plunger 24 is illustrated in the various figures as being flat with a circular cross section. Other shapes such as conical or hemispherical discs may be used. Additionally, multiple discs may be mounted on piston rod 18 to obtain a more efficient mixing action. The outer dimensions of plunger or piston 24 are such as to fit slidably within chamber 28 without excessive clearance. Perforations 38 are provided in plunger 24 and are for example circular in cross section although other geometric shapes may be used. It has been found that a multiple of perforations of small dimension about 1/16-inch diameter are more effective for the intermixing of the air with the liquid to produce foam, than is a single or several perforations of larger cross sections.

Piston rod 18 may be of more or less rigid material such as polypropylene or a metal. If desired piston rod 18 may be integral with plunger 22 as shown for example in FIG. 4 or may be separate therefrom and fastened thereto in any suitable manner as shown for example in FIG. 7. An advantageous means of securement is by heat swaging the ends of the piston rod.

The indicating means for assuring that the correct quantity of water will be mixed with the air in container 28 may take various forms. For example as shown in FIGS. 1—5 the metering cup 16 is of larger capacity than required but has a metering orifice 26 disposed at the correct water level. In a particularly advantageous form of this invention which is illustrated in FIG. 7 the metering cup is of the desired capacity for the water. Alternatively a solid knob 39 (FIG. 6) may be attached to the exposed end of rod 18 to act as a handle therefore and container 12 may contain an index mark 40 to indicate the correct water level. Similarly metering cup 16 may be transparent and may have an index mark instead of the metering orifice.

Cover 22 may also vary in construction. For example the skirt 36 may have screw threads on its inner surface to mate with threads on the outer surface of container 12 or may have matching lugs and slots or may be snap fit onto the container 12. Opening 20 in cover 22 is of a size to accommodate piston rod 18 with a sufficient clearance to readily permit reciprocation yet to prevent excessive amounts of the ingredients from being expelled upon upward movement of the piston rod. As a safeguard a sealing element 42 (FIG. 4) may be provided in opening 20.

The cover 22 is essential to device 10 so that the intermixing action of the piston or plunger 24 to produce air-liquid foam occurs both on the upstroke as well as the downstroke.

As indicated in FIGS. 1—5 and 7 the reservoir for holding foam-producing agent 14 at one end of container 12 may be simply an integral end portion of container 12. FIG. 6, however, shows an alternative form wherein foam-producing agent 14 is disposed in a separable housing 44 adjustably connected to the end of container 12. As the supply of foam-producing agent is gradually used housing 44 is manipulated to maintain the foam-producing agent 14 at a predetermined level.

An advantageous feature of this invention is the provision of protective disc 32 which may be a thin perforated disc of plastic material or of screen material or may be a reasonably stiff but porous fabric either woven or nonwoven. Disc 32 acts as a buffer to prevent direct contact of the wet plunger with the foam-producing agent and thus minimize the tendency of the foam-producing agent to become mucky.

It is also possible to form device 10 by housing the foam-producing agent at the upper end of the container with the piston rod extending through the bottom of container 12. The result would be inverting device 10 from the manner illustrated in the drawings.

FIG. 7 shows a particularly advantageous form of this invention wherein the foam-producing agent is absorbed in a spongelike pad 46 made for example of open pore urethane foamed elastomer. A variation of this arrangement would be to disposed a thin spongelike disc of urethane foam elastomer above a solid block of foam-producing agent. This is similar to the protective disc illustrated in FIGS. 1—6.

In order to obtain a foam of the desired consistency it is essential to maintain the proper proportions between the various foam-producing ingredients. For example it has been found in the case of shaving cream lather foam to maintain the proportion of air to water at 10—15 to 1. Additionally, to produce the proper amount of shaving cream lather for a single use it is advantageous to use a container 12 having approximately 60 ml. capacity with approximately 4 ml. of water. The thickness of foam-producing agent 14 is for example about ¼ inch before its initial use.

What I claim is:

1. A mixing and foam-producing device comprising a container, means at one end of said container for closing said container at said one end thereof and for holding a quantity of foam-producing agent, said foam-producing agent being a shaving cream, a removable cover closing the other end of said container to define a closed chamber of predetermined quantity between said cover and the foam-producing agent, said closed chamber having a capacity of about 60 ml., a rod extending through said cover into said chamber, a plunger at the end of said rod for intermittently moving toward and away from said foam-producing agent whereby a liquid may be placed in said chamber and be caused to mix with air in said chamber and the foam-producing agent to create foam by the mixing action thereof, indicating means for controlling the relationship between the volumes of liquid and air in said chamber to maintain the volume of air to the volume of liquid at a ratio of about 10—15 to 1, said indicating means being a metering cup detachably secured to said container and of substantially lesser diameter than said container, and indexing means associated with said metering cup at the level of said predetermined quantity.

2. A mixing and foam-producing device comprising a container, means at one end of said container for closing said container at said one end thereof and for holding a quantity of foam-producing agent, a removable cover closing the other end of said container to define a closed chamber of predetermined quantity between said cover and the foam-producing agent, a rod extending through said cover into said chamber, a plunger at the end of said rod for intermittently moving toward and away from said foam-producing agent whereby a liquid may be placed in said chamber and be caused to mix with air in said chamber and the foam-producing agent to create foam by the mixing action thereof, indicating means for controlling the relationship between the volumes of liquid and air in said chamber, said holding means including a removable foam-producing agent housing, adjusting means connecting said housing to said container for controlling the level of said foam-producing agent with respect to said one end of said container, and said indicating means being an index mark on said container.

3. A mixing and foam-producing device comprising a container, means at one end of said container for closing said container at said one end thereof and for holding a quantity of foam-producing agent, a removable cover closing the other end of said container to define a closed chamber of predetermined quantity between said cover and the foam-producing agent, a rod extending through said cover into said chamber, a plunger at the end of said rod for intermittently moving toward and away from said foam-producing agent whereby a liquid may be placed in said chamber and be caused to mix with air in said chamber and the foam-producing agent to create foam by the mixing action thereof, indicating means for controlling the relationship between the volumes of liquid and air in said chamber, said foam-producing agent being disposed adjacent the bottom of said chamber, a sponge being above said foam-producing agent for holding a quantity of liquid inserted into said chamber.

4. A mixing and foam-producing device comprising a container, means at one end of said container for closing said container at said one end thereof and for holding a quantity of foam-producing agent, a removable cover closing the other end of said container to define a closed chamber of predetermined quantity between said cover and the foam-producing agent, a rod extending through said cover into said chamber, a plunger at the end of said rod for intermittently moving toward and away from said foam-producing agent whereby a liquid may be placed in said chamber and be caused to mix with air in said chamber and the foam-producing agent to create foam by the mixing action thereof, indicating means for controlling the relationship between the volumes of liquid and air in said chamber, said indicating means including a metering cup secured to the exposed end of said rod to hold a predetermined quantity of liquid therein and to act as grasping means to facilitate the manipulation of said rod.

5. A device as set forth in claim 4 wherein said holding means is a reservoir at said one end of said container, and a thin spongelike disc being above said reservoir.

6. A device as set forth in claim 4 including biasing means for urging said plunger against said cover.

7. A device as set forth in claim 4 including a perforated protective disc disposed in said one end of said container for preventing direct contact between said plunger and the foam-producing agent, and said plunger having a multiplicity of relatively small perforations therein to enhance the intermixing of air and liquid.

8. A device as set forth in claim 4 wherein said metering cup is of greater capacity than said predetermined quantity of liquid, and indexing means being in said metering cup at the level of said predetermined quantity.

9. A device as set forth in claim 8 wherein said indexing means is a metering orifice.

10. A device as set forth in claim 4 wherein said holding means is a spongelike pad disposed at said one end of said container and having said foam producing agent absorbed therein.

11. A device as set forth in claim 10 wherein said foam-producing agent is a shaving cream, the proportion of said volume of air to said volume of liquid being about 10—15 to 1, said chamber being of about 60 ml. capacity, and said metering cup being of about 4ml. capacity.